United States Patent
Kurmala et al.

(10) Patent No.: US 9,712,504 B2
(45) Date of Patent: Jul. 18, 2017

(54) METHOD AND APPARATUS FOR AVOIDING DOUBLE-ENCRYPTION IN SITE-TO-SITE IPSEC VPN CONNECTIONS

(71) Applicant: Aruba Networks, Inc., Sunnyvale, CA (US)

(72) Inventors: Hari Krishna Kurmala, Sunnyvale, CA (US); Ramesh Ardeli, Sunnyvale, CA (US); Pradeep Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 75 days.

(21) Appl. No.: 14/693,817

(22) Filed: Apr. 22, 2015

(65) Prior Publication Data

US 2016/0315920 A1  Oct. 27, 2016

(51) Int. Cl.
*H04L 29/06* (2006.01)

(52) U.S. Cl.
CPC ...... *H04L 63/0471* (2013.01); *H04L 63/0272* (2013.01); *H04L 63/105* (2013.01); *H04L 63/1408* (2013.01); *H04L 63/164* (2013.01)

(58) Field of Classification Search
None
See application file for complete search history.

(56) References Cited

U.S. PATENT DOCUMENTS

| | | | | |
|---|---|---|---|---|
| 2008/0019525 A1* | 1/2008 | Kruegel | ............ | H04L 63/0428 380/273 |
| 2011/0113236 A1* | 5/2011 | Chenard | ............ | H04L 63/0471 713/154 |
| 2011/0320804 A1* | 12/2011 | Chan | ................. | G06F 12/0862 713/150 |

* cited by examiner

*Primary Examiner* — Mohammed Waliullah
(74) *Attorney, Agent, or Firm* — Hewlett Packard Enterprise Patent Department

(57) ABSTRACT

A system and a method are described that reduce or eliminate inefficiencies caused by double encryption in network tunnel communications. In particular, a set of virtual tunnels may be established that require a lower level of encryption in comparison to a full-encryption tunnel. Upon determining that a session is end-to-end encrypted, the system and method described herein may assign the session to one of the virtual tunnels instead of the full-encryption tunnel. By intelligently assigning sessions to virtual tunnels when encryption has already been applied, double encryption may be avoided, which will improve throughput and decrease processor usage. However, in cases where a session is not end-to-end encrypted, the full-encryption tunnel may be utilized to ensure secure communications are maintained between gateways.

22 Claims, 5 Drawing Sheets

METHOD AND APPARATUS FOR AVOIDING DOUBLE-ENCRYPTION IN SITE-TO-SITE IPSEC VPN CONNECTIONS

TECHNICAL FIELD

The present disclosure relates to a system that avoids performing double/repetitive encryption on communications in end-to-end tunneling communications by establishing one or more virtual tunnels that provide a lower level of encryption than a full-encryption tunnel. In this system, previously encrypted communications may be passed through one of the established virtual tunnels to avoid the overhead of double encryption provided by the full-encryption tunnel.

BACKGROUND

A site-to-site tunnel may be established for connecting a branch office network to a company's head office network. For example, the tunnel may be an Internet Protocol Security (IPsec) Virtual Private Network (VPN) tunnel. The VPN policies that are agreed upon by both ends at the time of tunnel establishment determine the encryption algorithm used for encrypting private data. The VPN gateway at either end encrypts and encapsulates outbound private data and sends it through the VPN tunnel to a peer VPN gateway over the Internet. On receipt of data through this tunnel, the peer VPN gateway removes the encapsulation and decrypts the payload and finally forwards the packet to the destination inside the private network. The VPN gateway at either end treats all the traffic the same and all the traffic gets encrypted at one end and decrypted at the other.

However, some of the private data sent through these VPN gateways may already be encrypted at the source and can only be decrypted at the final destination. For example, a secure shell (SSH) application may encrypt data before being passed to a local gateway to be again encrypted for transfer over the established tunnel. Such traffic gets double encrypted: once at the source (e.g., the SSH application) and next at the VPN gateway. Software implementation of encryption/decryption is usually processor intensive and can consume many processor cycles. Currently, there is no provision to prevent double encryption for already encrypted traffic at VPN gateways. Accordingly, processor cycles are being unnecessarily wasted to perform encryption/decryption at either end, resulting in lower network throughput.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
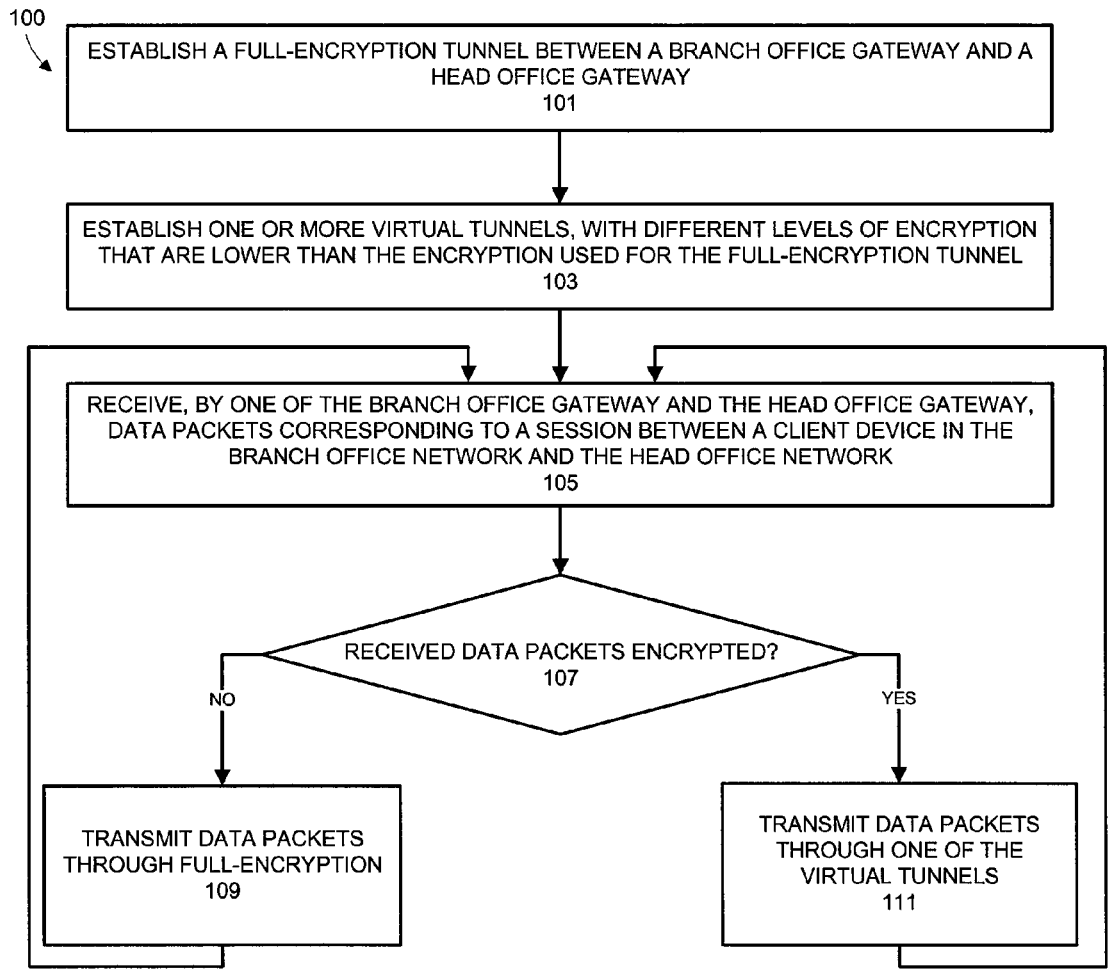
FIG. 1 shows a method for avoiding double encryption in a network system through the use/assignment of virtual tunnels according to one embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Overview

As will be described herein, systems and methods are proposed that establish a full-encryption tunnel and a set of virtual tunnels with lower levels of encryption between a set of gateways. For example, a branch office gateway may be located at a branch office and a head office gateway may be located at a head office (i.e., the company's headquarters or an office where network resources are located). The full-encryption tunnel facilitates secure communications between networks managed by the branch office gateway and head office gateway. For instance, during setup, the gateways may establish an encryption algorithm to be used for transmissions using the full-encryption tunnel. In this embodiment, the entirety of each data packet transmitted via the full-encryption tunnel is encrypted using the selected algorithm. In one embodiment, the full-encryption tunnel is an Internet Protocol Security (IPsec) Virtual Private Network (VPN) tunnel that manages data transmitted over the Internet between a branch office network and a head office network controlled by the branch office gateway and head office gateway, respectively.

Client devices in the branch office network may access data from the head office network via the full-encryption tunnel and vice versa. In some instances, the data communicated between the branch office network and the head office network may have been encrypted by an application/service prior to being transmitted to the local gateway. For example, a Microsoft Lync application, an instant messenger application, an RDP application, a WebEx application, a secure shell (SSH) application, a SFTP application, a SCP application, or a HTTPS application running on a client device may encrypt data before passing this encrypted data to the branch office gateway. Since encryption has already been applied, encrypting this data again by the local branch office gateway will provide little to no additional security while consuming valuable processing resources and lowering throughput. Accordingly, in some embodiments, data packets in a session may be examined to determine if encryption has already been applied. This analysis to determine encryption may involve the use of deep packet inspection (DPI) and/or inspection of the header of one or more packets. Upon determining that a session of data packets has already been encrypted, the system may limit or avoid encryption by the gateways through the use of a virtual tunnel.

For example, in some embodiments, one or more sub or virtual tunnels may be established along with the full-encryption tunnel between the branch office gateway and the headquarter gateway. The virtual tunnels may offer a reduced level of encryption in comparison to the full-encryption tunnel. For example, a null-encryption virtual tunnel and a header-only encryption virtual tunnel may be established along with the full-encryption tunnel. In this example, the gateways do not apply encryption to data packets passing through the null-encryption virtual tunnel. Further, the gateways only apply encryption to the headers of data packets passing through the header-only encryption virtual tunnel such that the address of transmitting/receiving devices reflected in data packets is obscured.

As noted above, when it is determined that data packets received by a gateway for transmission to another gateway have already been encrypted, one of the virtual tunnels may be selected for the transmissions. Conversely, upon determining that a session of data packets has not been encrypted, the local gateway may encrypt the data packets in their entirety and transmit the packets using the full-encryption tunnel. By allowing gateways to selectively apply encryption, the system and methods described herein avoid double encryption that may reduce network throughput and increase processor usage. These systems and methods will be described in greater detail below by way of example.

Avoiding Double Encryption Using Virtual Tunnels

FIG. 1 shows a method 100 for avoiding double encryption in a network system. The method 100 will be described in relation to the network system 200 shown in FIG. 2. In one embodiment, the method 100 causes one or more gateways $201_1$ or $201_2$ in the network system 200 to dynamically assign data to a full-encryption tunnel 203 or a virtual tunnel 205 that operates alongside the full-encryption tunnel 203. In one embodiment, the full-encryption tunnel 203 is an Internet Protocol Security (IPsec) Virtual Private Network (VPN) tunnel that utilizes a preconfigured encryption algorithm for performing encryption on the entirety of each packet transmitted therein. In contrast, the virtual tunnels 205 may apply lesser degrees of encryption to associated packet sessions. For example, encryption may not be applied to data packets transmitted through a null-encryption virtual tunnel $205_1$ and encryption may only be applied to the header (i.e., a designated number of bytes at the beginning of each data packet) of each data packet transmitted through a header-only encryption virtual tunnel $205_2$.

Each operation of the method 100 will be described by way of example below. Although shown and described in a particular order, the operations of the method 100 may be performed in a different order. For example, in some embodiments, two or more operations in the method 100 may be performed in at least partially overlapping time periods.

In one embodiment, the method 100 may commence at operation 101 with the establishment/configuration of a full-encryption tunnel 203 between the branch office gateway $201_1$ and the head office gateway $201_2$. The full-encryption tunnel 203 may be an Internet Protocol Security (IPsec) Virtual Private Network (VPN) tunnel that manages data transmitted over the Internet between a branch office network and a head office network controlled/managed by the branch office gateway $201_1$ and head office gateway $201_2$, respectively. Users of the client devices $209_1$-$209_3$ may securely access corporate resources in the head office network (i.e., resources provided by the servers $207_1$-$207_3$) via this full-encryption tunnel 203 and/or through the virtual tunnels 205 as will be described below.

Figure 3:
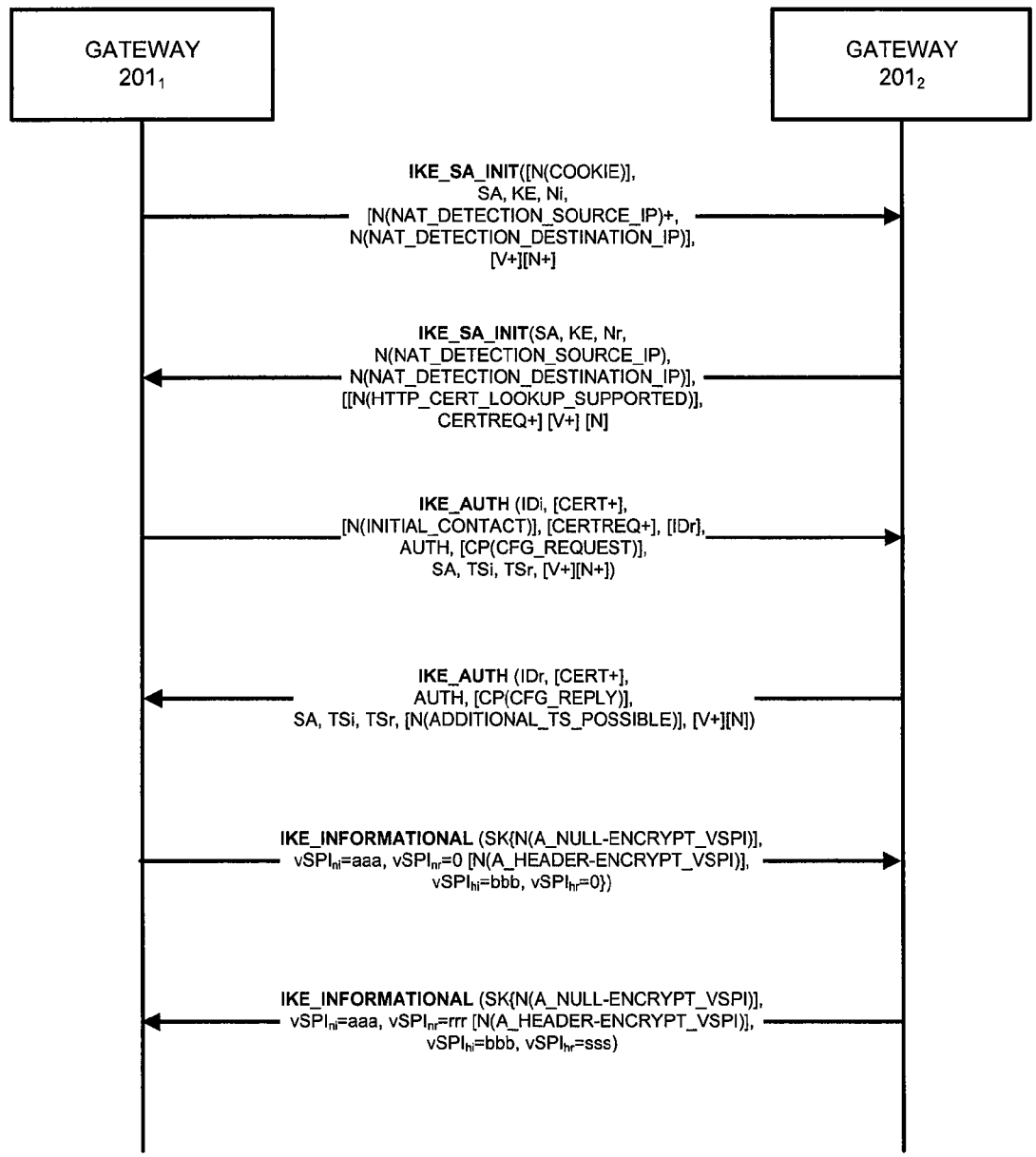
FIG. 3 shows a sequence diagram for establish a full-encryption tunnel and a set of virtual tunnels according to one embodiment.

In one embodiment, the gateways $201_1$ and $201_2$ may exchange a set of initialization and authentication messages to establish and configure the full-encryption tunnel 203 at operation 101. For example, IKE processes running on the gateways $201_1$ and $201_2$ may exchange a series of initialization and authentication messages as shown in FIG. 3 (e.g., IKE_SA_INIT and IKE_AUTH messages). These messages may include data describing the encryption algorithm that will be used for encrypting data transmitted via the full-encryption tunnel 203. For example, the initialization and authentication messages may establish that Data Encryption Standard (DES) encryption, Advanced Encryption Standard (AES), or a variant of these encryption algorithms (e.g., 3DES) are used for data sessions transmitted through the full-encryption tunnel 203 and configure the parameters used for these algorithms (e.g., a set of keys). In one embodiment, the messages passed between the gateways $201_1$ and $201_2$ may include security parameter indices (SPIs), which are used as keys to identify the full-encryption tunnel 203. For example, $SPI_i$ and $SPI_r$ may represent the full-encryption tunnel 203 configured between the initiator and responder (i.e., the branch office gateway $201_1$ and the head office gateway $201_2$), where the entirety of traffic is encrypted. Although a single full-encryption tunnel 203 is described in relation to the gateways $201_1$ and $201_2$, each of the gateways $201_1$ and $201_2$ may establish full-encryption tunnels 203 with other gateways 201 in the network system 200. For example, Table 1 below shows a set of security parameter indices $SPI_i$ and $SPI_r$ that may be assigned for full-encryption tunnels 203 between the gateway $201_1$ and multiple other gateways 201 that are located at the provided Internet Protocol (IP) addresses. The security parameter indices $SPI_i$ and $SPI_r$ may each be random numbers that are assigned at operation 101.

TABLE 1

| | Full-Encryption Tunnel | |
|---|---|---|
| Gateway IP | $SPI_i$ | $SPI_r$ |
| 150.1.1.1 | 111111 | 222222 |
| 160.1.1.1 | 333333 | 444444 |
| 180.1.1.1 | 555555 | 666666 |
| ... | ... | ... |
| 200.1.1.1 | 777777 | 888888 |

Figure 2:
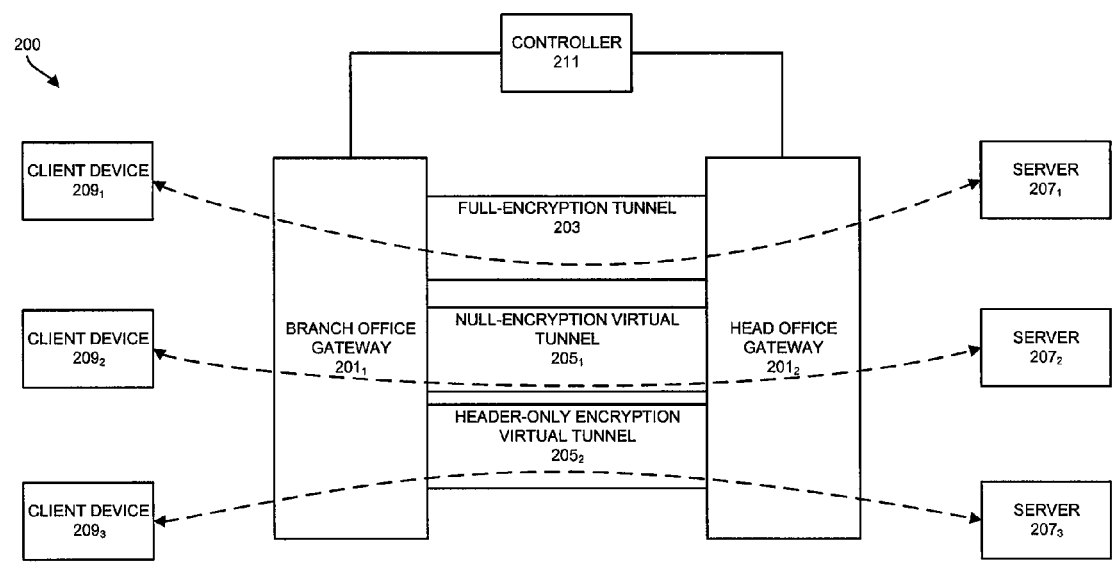
FIG. 2 shows a network system for securely and efficiently communicating data according to one embodiment.

Following establishment of the full-encryption tunnel 203, one or more virtual tunnels 205 may be established between the branch office and head office gateways $201_1$ and $201_2$ at operation 103. The one or more virtual tunnels 205 may operate within or may be entirely separate from the full-encryption tunnel 203 and may correspond to lower levels of encryption in comparison to the full-encryption tunnel 203. For example, as shown in FIG. 2, a null-encryption virtual tunnel $205_1$ and a header-only encryption virtual tunnel $205_2$ may be established at operation 103. In this configuration, the null-encryption virtual tunnel $205_1$ may not require the gateways $201_1$ and $201_2$ to apply any encryption to data packets transmitted therein. Instead, the data packets in a session transmitted via the null-encryption virtual tunnel $205_1$ may only be authenticated by the gateways $201_1$ and $201_2$. In contrast, a header-only virtual tunnel $205_2$ may only apply encryption to the IP header of data packets (e.g., a subset of bytes at the beginning of each data packet corresponding to the encryption algorithm being utilized by the header-only virtual tunnel $205_2$).

In one embodiment, the virtual tunnels 205 may be established through the use of IKE informational messages that are passed between the gateways $201_1$ and $201_2$. There are three different types of payloads that are carried in IKE informational messages: (1) notify [N], (2) delete [D] and (3) configuration payload [CP]. In one embodiment, notify [N] informational messages may be used to setup each of the virtual tunnels 205. These notify informational messages may utilize new/unique identifying status types that indicate that the informational messages are intended to establish/configure one or more virtual tunnels 205. For example, the status types 16500 and 16501 may be used for negotiating SPIs for one or more virtual tunnels 205. In particular, as shown in FIG. 3, following the establishment of the full-encryption tunnel 203 using the IKE_SA_INIT and IKE_AUTH messages, the IKE process running on one of the gateways $201_1/201_2$ may exchange IKE_INFORMATIONAL messages. The IKE_INFORMATIONAL message may be passed between the gateways $201_1$ and $201_2$ for the establishment of the virtual tunnels 205. In particular, the IKE_INFORMATIONAL messages may include the virtual SPIs (vSPIs) for each newly created virtual tunnel 205. For example, in FIG. 3, the IKE_INFORMATIONAL messages may use the status types 16500 and 16501 (i.e., A_NULL-ENCRYPT_VSPI=16500 and A_HEADER-ENCRYPT_VSPI=16501) to establish two virtual tunnels: (1) a null-encryption virtual tunnel $205_1$ and (2) a header-only encryption virtual tunnel $205_2$. Table 2 below shows the virtual security parameter indices $vSPI_{ni}$ and $vSPI_{nr}$ corresponding to the null-encryption virtual tunnel $205_1$ and the virtual security parameter indices $vSPI_{hi}$ and $vSPI_{hr}$ corresponding to the header only encryption virtual tunnel $205_2$ that may be established between a gateway 201 and a set of other gateways 201 located at the provided IP addresses.

TABLE 2

| Gateway | Main Tunnel | | Null Encryption Virtual Tunnel | | Header-Only Encryption Virtual Tunnel | |
| --- | --- | --- | --- | --- | --- | --- |
| IP | $SPI_i$ | $SPI_{Rr}$ | $vSPI_{ni}$ | $vSPI_{nr}$ | $vSPI_{hi}$ | $vSPI_{hr}$ |
| 150.1.1.1 | 111111 | 222222 | 121212 | 343434 | 778877 | 990099 |
| 160.1.1.1 | 333333 | 444444 | 565656 | 787878 | 111222 | 333444 |
| 180.1.1.1 | 555555 | 666666 | 909090 | 112211 | 555666 | 777888 |
| ... | ... | ... | ... | ... | ... | ... |
| 200.1.1.1 | 777777 | 888888 | 334433 | 556655 | 999000 | 123456 |

The corresponding encryption keys (SK_ei, SK_er) and integrity keys (SK_ai, SK_ar) derived during an IKE handshake are pushed to the datapath for these SPI's/vSPI's for handling incoming traffic. Notification data for vSPI's that are exchanged in informational messages are encrypted and authenticated using (SK_ei, SK_er) and (SK_ai, SK_ar) to avoid eavesdropping. In some embodiments, if the informational message transmitted by one gateway $201_1/201_2$ is rejected by the other gateway $201_1/201_2$, then the virtual tunnels 205 are not generated. In this case, only the full-encryption tunnel 203 established at operation 101 is used for all data packet transmissions/sessions.

Following successful establishment of virtual tunnels 205 at operation 103, the method 100 may wait for the receipt of one or more packets at operation 105 corresponding to a session between a client device 209 and a server 207. For example, the gateway $201_1$ may receive a data packet from the client device $209_1$. The packet may be generated by an application running on the client device $209_1$ and may be destined and may correspond to a service provided by the server $207_1$. For example, a Microsoft Lync application, an instant messenger application, an RDP application, a WebEx application, a secure shell (SSH) application, a SFTP application, a SCP application, or a HTTPS application may be running on the client device $209_1$ and may be in communication with a corresponding application/process running on the server $207_1$. As will be described in greater detail below, the application on the client device $209_1$ may have encrypted the data packets prior to transmission to the branch office gateway $201_1$. However, in other embodiments, no encryption may be applied to the data packets that are received by the gateway $201_1$ at operation 105.

At operation 107, the gateway $201_1/201_2$ receiving the data packets may determine if the received packets are encrypted. Namely, the gateway $201_1/201_2$ that receives the packets at operation 105 may determine if the application that generated the packets or another intervening process/application encrypted the packets prior to their receipt by the gateway $201_1/201_2$ at operation 105. The determination at operation 107 may be performed using a variety of techniques, including deep packet inspection (DPI) and/or inspection of the header of one or more packets.

Using DPI, the gateway $201_1/201_2$ receiving the packets at operation 105 may determine whether the session is already encrypted (i.e., each of the packets in the session is encrypted). In particular, depending on the complexity of the session, DPI may classify a session on receipt of one or more data packets for the session. The classification may be an association with a particular application, service, or class of data. Once the session is classified as belonging to a particular application/service/class, the gateway $201_1/201_2$ may determine whether that classification is end-to-end encrypted. For example, the exchange of SSL handshake messages implies that the session is an SSL session. Since SSL sessions are known to be encrypted, operation 107 may conclude that the received data packets are encrypted. Other examples of encrypted applications/services include SSH, WebEx, SharePoint, Meeting Place, Lync, GoToMeeting, Adobe Connect, and Citrix Online. In one embodiment, the gateways 201 may store a list/table of application/services/classes that are known to encrypt data packets for corresponding sessions. Following classification of a session using DPI, the resultant classification may be compared against the list of applications/services to determine whether the session was encrypted.

In some embodiments, a process running in the datapath (e.g., a firewall stack), may use L3/L4 header information (e.g., metadata in the header) to identify whether a session is end-to-end encrypted between a client device 209 and a server 207. For example, any traffic seen on TCP port 443 may be designated as SSL encrypted at operation 107. Further, L4 protocol type ESP may indicate that the session is IPsec encrypted. Moreover, any future extensions to L3/L4 headers may indicate that the session is encrypted. Namely, a flag/data value in the header of a data packet may indicate that an associated session is end-to-end encrypted. Accordingly, examining the header of one or more data packets at operation 107 may reveal whether the session is end-to-end encrypted.

Although described as the receiving gateway $201_1/201_2$ performing DPI and or header inspection to determine encryption, in other embodiments the gateway $201_1/201_2$ could redirect the first few packets received for a session to a controller 211. The controller 211 may thereafter examine the packets to determine/detect whether the session is encrypted and provide feedback in flow information to the gateway $201_1/201_2$.

For a session that is not already encrypted, as detected/determined at operation 107, operation 109 may transmit the data packets in this session using the full-encryption tunnel 203. Using the full-encryption tunnel 203 in this situation will ensure that the data packets are fully encrypted and not susceptible to being compromised.

Conversely, for a session already end-to-end encrypted, no additional encryption or a lower level of encryption may be appropriate. In particular, the processing power and time involved in the gateways $201_1/201_2$ fully encrypting the already encrypted data packets and decrypting these packets following their transmission to the other gateway $201_1/201_2$ is wasted as the packets were already encrypted. Accordingly, this inefficient double encryption may be avoided through the use of one of the virtual tunnels 205 at operation 111. As noted above, the virtual tunnels 205 provide reduced encryption (e.g., no/null-encryption or header-only encryption) in comparison to the full-encryption tunnel 203, which encrypts the entirety of each packet. Thus, transmission via one of these virtual tunnels 205 eliminates or reduces the negative performance effects of double encryption that would be experienced using the full-encryption tunnel 203.

In the examples provided above, both a null-encryption virtual tunnel $205_1$ is established and a header-only encryption virtual tunnel $205_2$ is established at operation 103. In some cases, the header-only encryption virtual tunnel $205_2$ may be preferable over the null-encryption virtual tunnel $205_1$ as the header-only encryption virtual tunnel $205_2$ may eliminate the exposure of internal addresses of client devices 209 and servers 207. Namely, when the null-encryption virtual tunnel $205_1$ is selected, data packets are sent in plaintext with the internal addresses of client devices 209 and servers 207 exposed. For certain applications and/or for certain organizations, this exposure may not be acceptable. In such cases, these sessions may be sent through the header-only encryption virtual tunnel $205_2$, which will encrypt the header (i.e., a specified number or subset of bytes of the beginning of each packet) to mask internal addresses (i.e., Internet Protocol (IP) addresses). In this case, the number of bytes of the header (e.g., the number of bytes of a TCP/IP header) that is encrypted will depend on the encryption algorithm agreed upon during establishment of the full-encryption tunnel 203. In particular, ideally only the IP header will be encrypted; however, based on the block size used for encryption, the amount of bytes that will be encrypted may extend into the TCP header or other areas of the data packet. For example, the block size for DES/3DES is eight bytes while the block size for AES-128/192/256 is sixteen bytes. When the IP header of a data packet is twenty bytes, twenty-four bytes of the data packet will be encrypted using the header-only encryption tunnel $205_2$ based on the use of eight byte blocks in DES/3DES (i.e., 20 bytes of the IP header and 4 bytes of the TCP header are encrypted), while thirty-two bytes of the data packet will be encrypted using the header-only encryption tunnel $205_2$ based on the use of sixteen byte blocks when AES is being used (i.e., 20 bytes of the IP header and 12 bytes of the TCP header are encrypted).

In some embodiments where multiple virtual tunnels 205 are established between a pair of gateways 201 (e.g., the null-encryption virtual tunnel $205_1$ and the header-only encryption virtual tunnel $205_2$), operation 111 may rely on a table that maps applications/processes/classes of data to a preferred virtual tunnel 205. For example, a set of applications that are concerned with exposure of associated client devices 209 and/or servers 207 may be associated with the header-only virtual tunnel $205_2$ while other applications may be associated in the table with the null-encryption virtual tunnel $205_1$.

Figure 4:
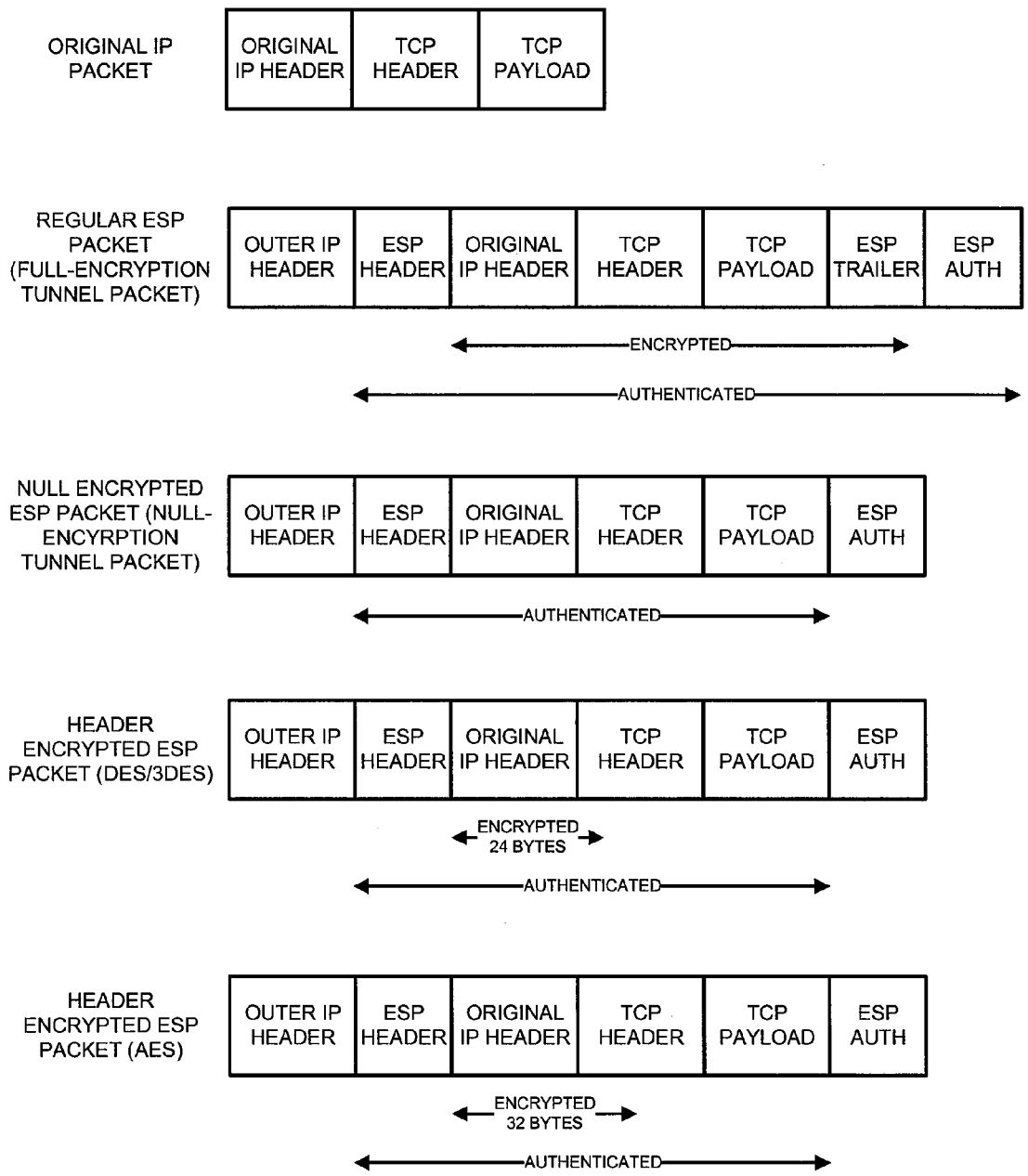
FIG. 4 shows a set of data packets with different types and levels of encryption according to one embodiment.

FIG. 4 shows a set of packets according to one embodiment of the invention. As shown in FIG. 4, an original IP data packet generated by an application/process running on a client device 209 or a server 207 may include an IP header, a TCP header, and a TCP payload. Depending on the application/process, the TCP payload may have been encrypted before arriving at a local gateway 201 as described in relation to operation 107 above. When the data packet is fully encrypted using the full-encryption tunnel 203, an outer IP header, ESP header, ESP trailer, and ESP authentication elements may be added to the original IP packet. Conversely, when no additional encryption is performed on the original IP data packet (i.e., through use of the null-encryption virtual tunnel $205_1$), an outer IP header, ESP header, and ESP authentication components may be added to the original IP packet. When the header-only encryption virtual tunnel $205_2$ is used, a variable amount of the leading bytes of the original IP packet may be encrypted as shown and described above in relation to DES/3DES and AES.

In some embodiments, data packets from each session may originally be transmitted via the full-encryption tunnel 203 until operation 107 may successfully classify the session as encrypted or un-encrypted. Upon classifying the session as encrypted, the method 100 may choose to route packets through one of the virtual tunnels $205_1$ or $205_2$.

In some embodiments, the gateway 201 receiving data packets via one of the virtual tunnels 205 may flag the session to have response packets sent over the same virtual tunnel 205. Accordingly, packets for the session originating at the other gateway 201 may also transmit data using no encryption or using less encryption than the full-encryption tunnel 203 via use of the same virtual tunnel 205.

As shown in FIG. 1, the method 100 may return to operation 105 to continue processing sessions passing through the gateways $201_1$ and $201_2$. Accordingly, the method 100 may assign multiple sessions to corresponding tunnels 203/205 to preserve secure communications while reducing the effects of double encryption.

As described above, the method 100 may intelligently assign already encrypted sessions to a virtual tunnel 205 that utilizes lower levels of encryption in comparison to the full-encryption tunnel 203 counterpart. In particular, when a session is determined to be end-to-end encrypted, associated packets may be transmitted through a virtual tunnel 205 instead of the full-encryption tunnel 203. Since the virtual tunnels 205 provide lower levels of encryption, the virtual tunnel 205 allows the sessions to avoid double encryption, which will improve throughput and decrease processor usage. However, in cases where a session is not end-to-end encrypted, the full-encryption tunnel 203 may be utilized to ensure secure communications are maintained between gateways 201.

Returning to FIG. 2, each component of the network system 200 will be described. Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 5:
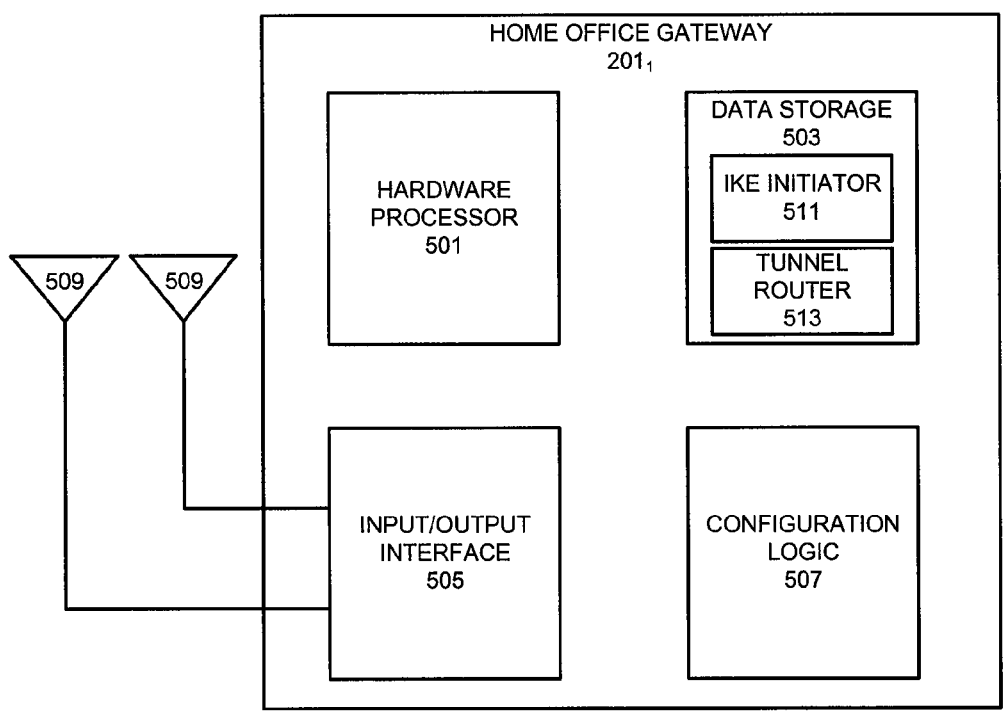
FIG. 5 shows a component diagram of a gateway according to one embodiment.

FIG. 5 shows a component diagram of the branch office gateway $201_1$ according to one embodiment. The branch office gateway $201_1$ may be any digital device that is capable of assigning sessions to the full-encryption tunnel 203 or a virtual tunnel 205 as described above in relation to the method 100. As shown, the branch office gateway $201_1$ comprises one or more of: a hardware processor 501, data storage 503, an input/output (I/O) interface 505, and device configuration logic 507. Each of these components of the branch office gateway $201_1$ will be described in further detail below.

The data storage 503 of the branch office gateway $201_1$ may include a fast read-write memory for storing programs and data during operations and a hierarchy of persistent memory, such as Read Only Memory (ROM), Erasable Programmable Read Only Memory (EPROM,) and/or Flash memory for example, for storing instructions and data needed for the startup and/or operation of the branch office gateway $201_1$. For example, as shown in FIG. 5, the data storage 503 may include the IKE initiator 511 and the tunnel router 513 that may be executed by the hardware processor 501. The IKE initiator 511 may establish the full-encryption tunnel 203 and the one or more virtual tunnels 205 and the tunnel router 513 may assign sessions to the full-encryption 203 and virtual 205 tunnels according to the method 100 described above. In one embodiment, the data storage 503 is a distributed set of data storage components.

In one embodiment, the I/O interface 505 corresponds to one or more components used for communicating with other devices (e.g., the client devices $209_1$-$209_3$, the servers $207_1$-$207_3$, the head office gateway $202_2$, the controller 211, and/or other devices in the system 200) via wired or wireless signals. The I/O interface 505 may include a wired network interface such as an IEEE 802.3 Ethernet interface and/or a wireless interface such as an IEEE 802.11 WiFi interface and corresponding antennas 509. The I/O interface 505 may facilitate communications with the client devices $209_1$-$209_3$, the servers $207_1$-$207_3$, the head office gateway $202_2$, the controller 211, and/or other devices in the system 200 over corresponding wired or wireless connections.

In one embodiment, the hardware processor 501 is coupled to the data storage 503 and the I/O interface 505. The hardware processor 501 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 507 includes one or more functional units implemented using firmware, hardware, software, or a combination thereof. In some embodiments, the configuration logic 507 may be used for configuring parameters of the gateway device $201_1$. For example, the device configuration logic 507 may (1) establish the full-encryption tunnel 203 and one or more virtual tunnels 205 and (2) assign sessions to the full-encryption tunnel 203 or one of the virtual tunnels 205 according to the method 100 described above in conjunction or apart from the IKE initiator 511 and the tunnel router 513.

Although the gateway $201_1$ is described above, in some embodiments, the gateway $201_2$ may be similarly configured and designed. In particular, the gateway $201_2$ may comprise one or more of: a hardware processor 501, data storage 503, an input/output (I/O) interface 505, and device configuration logic 507 such that the gateway $201_2$ may manage data traffic through the tunnels 203 and 205 as described above in the method 100.

In one embodiment, the client devices $209_1$-$209_3$, the servers $207_1$-$207_3$, and the controller 211 may be any wired or wireless digital device capable of receiving and transmitting data over wired or wireless mediums. Similar to the gateway $201_1$, the client devices $209_1$-$209_3$, the servers $207_1$-$207_3$, and the controller 211 may comprise one or more of: a hardware processor 501, data storage 503, an input/output (I/O) interface 505, and device configuration logic 507 such that the client devices $209_1$-$209_3$, the servers $207_1$-$207_3$, and the controller 211 may operate according to the method 100 described above.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages is applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for efficiently managing secure communications using tunnels, comprising:
    establishing a full encryption tunnel between a first gateway and a second gateway, wherein data packets are entirely encrypted by the first gateway before transmission through the full encryption tunnel to the second gateway;
    establishing a first virtual tunnel between the first gateway and the second gateway, wherein data packets transmitted through the first virtual tunnel have a reduced level of encryption applied by the first gateway before transmission through the first virtual tunnel in comparison to the full encryption tunnel;
    receiving, by the first gateway, a set of data packets from a first computing device located within a first network managed by the first gateway, wherein the data packets correspond to a session between the first computing device and a second computing device located in a second network managed by the second gateway;
    determining whether the data packets in the session are encrypted; and
    in response to determining that the data packets are encrypted, transmitting the data packets through the first virtual tunnel to the second computing device via the second gateway; and
    in response to determining that the data packets are unencrypted, transmitting the data packets through the full-encryption tunnel to the second computing device via the second gateway.

2. The method of claim 1, wherein determining whether the data packets are encrypted comprises:
    analyzing the data packets using deep packet inspection (DPI) to classify the data packets as being associated with an application, a process, or a class of data; and
    determining that the data packets are encrypted based on the classification.

3. The method of claim 1, wherein determining whether the data packets are encrypted comprises:
    analyzing a header of one or more of the data packets; and
    determining that the data packets are encrypted based on metadata of the data packets within the header.

4. The method of claim 3, wherein the metadata includes a flag that indicates the data packets are encrypted.

5. The method of claim 1, further comprising:
    establishing a second virtual tunnel between the first gateway and the second gateway, wherein data packets transmitted through the second virtual tunnel have a reduced level of encryption applied by the first gateway before transmission through the second virtual tunnel in comparison to the full encryption tunnel.

6. The method of claim 5, wherein establishing the first and second virtual tunnels comprises assigning pairs of virtual security parameter indices (SPIs) to each of the first and second virtual tunnels.

7. The method of claim 5, wherein the first gateway applies no additional encryption to the data packets transmitted through the first virtual tunnel and the first gateway applies encryption only to a subset of bytes of each of the data packets transmitted through the second virtual tunnel.

8. The method of claim 7, wherein the subset of bytes includes a header of each data packet.

9. The method of claim 1, wherein a controller separate from the first and second gateways determines whether the data packets of the session are encrypted.

10. The method of claim 1, wherein one or more of the data packets in the session are sent through the full encryption tunnel until it is determined that the data packets in the session are encrypted, at which point subsequent data packets in the session are sent through the first virtual tunnel.

11. A non-transitory computer readable medium comprising instructions which, when executed by one or more hardware processors of a network device operating in a network system, cause the network device to:
    establish a full encryption tunnel between a first gateway and a second gateway, wherein data packets are entirely encrypted by the first gateway before transmission through the full encryption tunnel to the second gateway;
    establish a first virtual tunnel between the first gateway and the second gateway, wherein data packets transmitted through the first virtual tunnel have a reduced level of encryption applied by the first gateway before transmission through the first virtual tunnel in comparison to the full encryption tunnel;
    process a set of data packets received from a first computing device located within a first network managed by the first gateway, wherein the data packets correspond to a session between the first computing device and a second computing device located in a second network managed by the second gateway;
    determine whether the data packets in the session are encrypted; and
    in response to determining that the data packets are encrypted, transmit the data packets through the first virtual tunnel to the second computing device via the second gateway; and
    in response to determining that the data packets are unencrypted, transmitting the data packets through the full-encryption tunnel to the second computing device via the second gateway.

12. The non-transitory computer readable medium of claim 11, wherein the instructions that determine whether the data packets are encrypted cause the network device to:
    analyze the data packets using deep packet inspection (DPI) to classify the data packets as being associated with an application, a process, or a class of data; and
    determine that the data packets are encrypted based on the classification.

13. The non-transitory computer readable medium of claim 11, wherein the instructions that determine whether the data packets are encrypted cause the network device to:
    analyze a header of one or more of the data packets; and
    determine that the data packets are encrypted based on metadata of the data packets within the header.

14. The non-transitory computer readable medium of claim 13, wherein the metadata includes a flag that indicates the data packets are encrypted.

15. The non-transitory computer readable medium of claim 11, comprising further instructions which, when executed by the one or more hardware processors of the network device operating in a network system, cause the network device to:

establish a second virtual tunnel between the first gateway and the second gateway, wherein data packets transmitted through the second virtual tunnel have a reduced level of encryption applied by the first gateway before transmission through the second virtual tunnel in comparison to the full encryption tunnel.

16. The non-transitory computer readable medium of claim 15, wherein the instructions that establish the first and second virtual tunnels cause the network device to:

assign pairs of virtual security parameter indices (SPIs) to each of the first and second virtual tunnels.

17. The non-transitory computer readable medium of claim 15, wherein the first gateway applies no additional encryption to the data packets transmitted through the first virtual tunnel and the first gateway applies encryption only to a subset of bytes of each of the data packets transmitted through the second virtual tunnel.

18. The non-transitory computer readable medium of claim 17, wherein the subset of bytes includes a header of each data packet.

19. The non-transitory computer readable medium of claim 11, wherein a controller separate from the first and second gateways determines whether the data packets of the session are encrypted.

20. The non-transitory computer readable medium of claim 11, wherein one or more of the data packets in the session are sent through the full encryption tunnel until it is determined that the data packets in the session are encrypted at which point subsequent data packets in the session are sent through the first virtual tunnel.

21. The non-transitory computer readable medium of claim 11, comprising further instructions which, when executed by the one or more hardware processors of the network device operating in a network system, cause the network device to:

in response to determining that the data packets are unencrypted, transmit the data packets through the full-encryption tunnel to the second computing device via the second gateway.

22. A network device for efficiently managing secure communications using tunnels, comprising:

a hardware processor to:

establish a full encryption tunnel between a first gateway and a second gateway, wherein data packets are entirely encrypted by the first gateway before transmission through the full encryption tunnel to the second gateway, and establish a first virtual tunnel between the first gateway and the second gateway, wherein data packets transmitted through the first virtual tunnel have a reduced level of encryption applied by the first gateway before transmission through the first virtual tunnel in comparison to the full encryption tunnel, process a set of data packets received from a first computing device located within a first network managed by the first gateway, wherein the data packets correspond to a session between the first computing device and a second computing device located in a second network managed by the second gateway, determine whether the data packets in the session are encrypted; and in response to determining that the data packets are encrypted, transmit the data packets through the first virtual tunnel to the second computing device via the second gateway; and in response to determining that the data packets are unencrypted, transmitting the data packets through the full-encryption tunnel to the second computing device via the second gateway.

* * * * *